United States Patent
Ko et al.

(10) Patent No.: US 8,314,914 B2
(45) Date of Patent: Nov. 20, 2012

(54) LIQUID CRYSTAL DISPLAY AND EXPOSURE MASK FOR MANUFACTURING LIQUID CRYSTAL DISPLAY

(75) Inventors: Gwang-Bum Ko, Asan-si (KR); Yeon-Mun Jeon, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 105 days.

(21) Appl. No.: 13/094,230

(22) Filed: Apr. 26, 2011

(65) Prior Publication Data

US 2012/0169983 A1 Jul. 5, 2012

(30) Foreign Application Priority Data

Dec. 31, 2010 (KR) .................. 10-2010-0140621

(51) Int. Cl.
*G02F 1/1343* (2006.01)
(52) U.S. Cl. ............................................ 349/142
(58) Field of Classification Search .................. 349/142
See application file for complete search history.

(56) References Cited

U.S. PATENT DOCUMENTS

| | | | |
|---|---|---|---|
| 2008/0143946 A1 | 6/2008 | Wang et al. | |
| 2009/0273750 A1 | 11/2009 | Liao et al. | |

FOREIGN PATENT DOCUMENTS

| | | |
|---|---|---|
| JP | 2008-209636 | 9/2008 |
| JP | 2009-115841 | 5/2009 |
| JP | 2010-008874 | 1/2010 |
| KR | 2006-0095692 | 9/2006 |
| KR | 2007-0002225 | 1/2007 |
| KR | 10-0680510 | 2/2007 |
| KR | 10-0717186 | 5/2007 |
| KR | 2008-0040304 | 5/2008 |
| KR | 2010-0068035 | 6/2010 |
| KR | 2010-0071917 | 6/2010 |

*Primary Examiner* — Phu Vu
(74) *Attorney, Agent, or Firm* — H.C. Park & Associates, PLC

(57) ABSTRACT

A liquid crystal display includes a first substrate facing a second substrate, a liquid crystal layer between the first and second substrates, a first electrode disposed on the first substrate and being planar, and a second electrode disposed on the first substrate with branch electrodes overlapping the first electrode. The branch electrode includes boundary regions disposed at opposing ends thereof and at least two main regions disposed between the boundary regions. The main regions include a first main region adjacent to a second main region. A first angle, formed by the branch electrode in the first main region with respect to a first direction, is different from a second angle formed by the branch electrode in the second main region with respect to the first direction. A third angle, formed by the branch electrode in the boundary regions with respect to the first direction, is larger than the first and second angles.

32 Claims, 12 Drawing Sheets

LIQUID CRYSTAL DISPLAY AND EXPOSURE MASK FOR MANUFACTURING LIQUID CRYSTAL DISPLAY

CROSS-REFERENCE TO RELATED APPLICATION

This application claims priority from and the benefit of Korean Patent Application No. 10-2010-0140621, filed on Dec. 31, 2010, which is hereby incorporated by reference for all purposes as if fully set forth herein.

BACKGROUND OF THE INVENTION

1. Field of the Invention

Exemplary embodiments of the present invention relate to a liquid crystal display and an exposure mask for manufacturing the liquid crystal display.

2. Discussion of the Background

A liquid crystal display is a type of flat panel display that has become widely used. Liquid crystal displays may include a liquid crystal layer interposed between two display panels having field generating electrodes such as a pixel electrode and a common electrode. The liquid crystal display generates an electric field in the liquid crystal layer by applying voltage to the field generating electrode. During application of the voltage, directions of liquid crystal molecules (i.e., the molecular axis alignment) of the liquid crystal layer are manipulated to control polarization of incident light, thereby displaying an image. The transmittance of the liquid crystal display may increase as the degree of control over the liquid crystal molecules' alignments within the electric field increases.

To control application of the voltage to the pixel electrodes, each pixel electrode of the liquid crystal display is connected with a switching element connected to signal lines such as a gate line and a data line. The switching element may be a 3-terminal element such as a thin film transistor, and it transfers a data voltage to the pixel electrode through an output terminal thereof.

In the liquid crystal display, the pixel electrode and the common electrode generate the electric field in the liquid crystal layer and may be provided on one display panel where the switching element is formed. The pixel electrode or the common electrode of the liquid crystal display may include a plurality of branch electrodes and may be divided into different regions in which the inclined angles of the plurality of branch electrodes are different from each other to improve the viewing angle of the liquid crystal display by diversifying the inclined directions of the liquid crystal molecules.

The above information disclosed in this section is for enhancement of understanding of the background of the invention, and it may contain information not in the prior art or known to a person of ordinary skill in the art.

SUMMARY OF THE INVENTION

Exemplary embodiments of the present invention provide an increase in the response speed of liquid crystals while maintaining the transmittance of a liquid crystal display.

Exemplary embodiments of the present invention also provide improvements to the display quality of a liquid crystal display.

Exemplary embodiments of the present invention further provide a display with electric field generating electrodes that may reduce display textures and may improve the display quality of a display.

An exemplary embodiment of the present invention discloses a liquid crystal display that comprises a first substrate and a second substrate facing each other, a liquid crystal layer interposed between the first substrate and the second substrate, a first electrode disposed on the first substrate, the first electrode being planar, and a second electrode disposed on the first substrate and comprising a plurality of branch electrodes overlapping the first electrode. The branch electrode comprises a pair of boundary regions disposed at opposing ends of the branch electrode, and at least two main regions disposed between the pair of boundary regions. The at least two main regions comprise a first main region and a second main region adjacent to each other. A first angle, formed by the branch electrode in the first main region with respect to a first direction, is different from a second angle formed by the branch electrode in the second main region with respect to the first direction, and a third angle, formed by the branch electrode in the pair of boundary regions with respect to the first direction, is larger than the first angle and the second angle.

An exemplary embodiment of the present invention also discloses a liquid crystal display that comprises a first substrate and a second substrate facing each other, a liquid crystal layer interposed between the first substrate and the second substrate, a first electrode disposed on the first substrate, and a second electrode disposed on the first substrate and comprising a plurality of branch electrodes overlapping the first electrode. The branch electrode comprises a pair of boundary regions disposed at opposing ends of the branch electrode and at least two main regions disposed between the pair of boundary regions. The at least two main regions comprise a first main region and a second main region adjacent to each other. A first angle, formed by the branch electrode in the first main region with respect to a first direction, is different from a second angle formed by the branch electrode in the second main region with respect to the first direction, and a length of each of the pair of boundary regions in the first direction is less than or equal to 10 µm.

An exemplary embodiment of the present invention additionally discloses a liquid crystal display that comprises a first substrate and a second substrate facing each other, a liquid crystal layer interposed between the first substrate and the second substrate, a first electrode disposed on the first substrate, and a second electrode disposed on the first substrate and comprising a plurality of branch electrodes overlapping the first electrode. The branch electrode comprises a pair of boundary regions disposed at opposing ends of the branch electrode and a main region disposed between the pair of boundary regions. Angles, formed by the plurality of branch electrodes with a first direction in the main region, gradually increase from a reference line parallel to the first direction. A largest angle, among the angles in the main region, is a first angle, and a second angle, formed by the branch electrode in the pair of boundary regions with the first direction, is larger than the first angle.

An exemplary embodiment of the present invention also discloses an exposure mask to form a second electrode in manufacturing a liquid crystal display comprising a first electrode disposed on a first substrate between the first substrate and a second substrate facing the first substrate with a liquid crystal layer interposed between the first and second substrates. The second electrode comprises a plurality of branch electrodes overlapping the first electrode. The exposure mask comprises a first part corresponding to a space between two adjacent branch electrodes among the plurality of branch electrodes of the second field generating electrode and a second part connected to a vertex of a corner of an acute angle among corners of the first part and comprising four straight sides.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
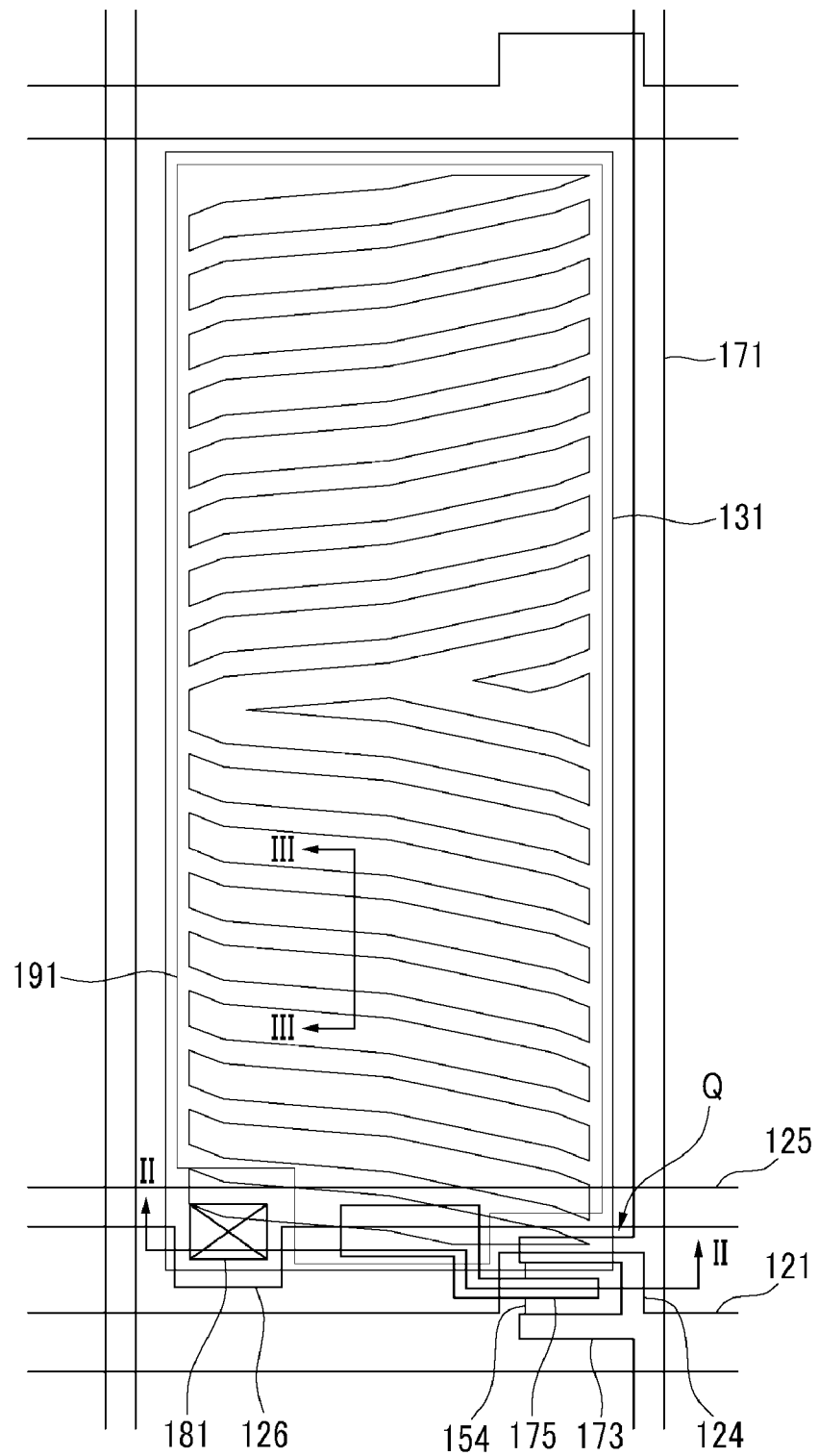
FIG. 1 shows a layout view of one pixel of a liquid crystal display according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present. First, a liquid crystal display according to an exemplary embodiment of the present invention will be described with reference to FIGS. 1 to 5.

Figure 2:
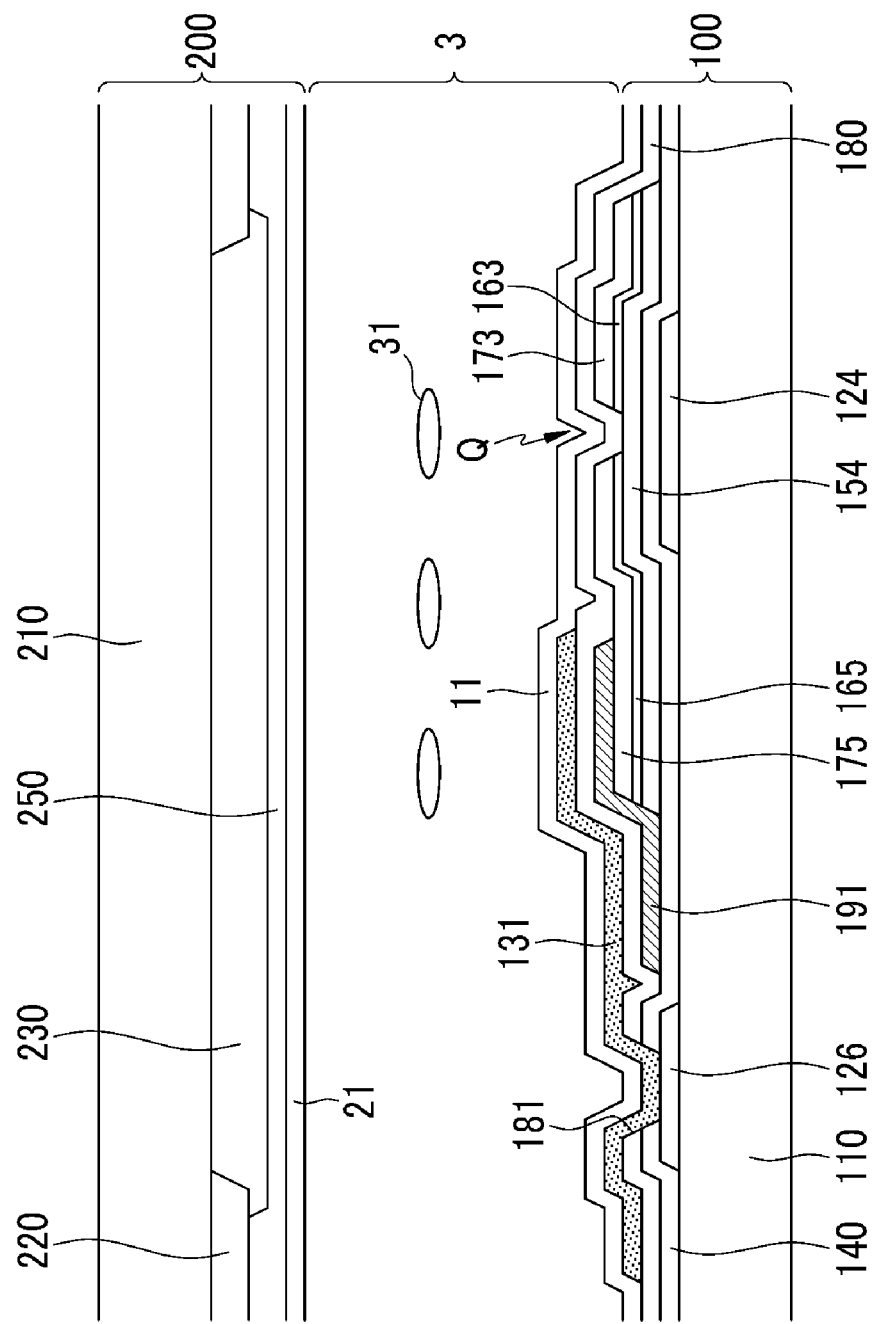
FIG. 2 and FIG. 3 are cross-sectional views of the liquid crystal display taken along lines II-II and III-III of FIG. 1, respectively.
Figure 3:
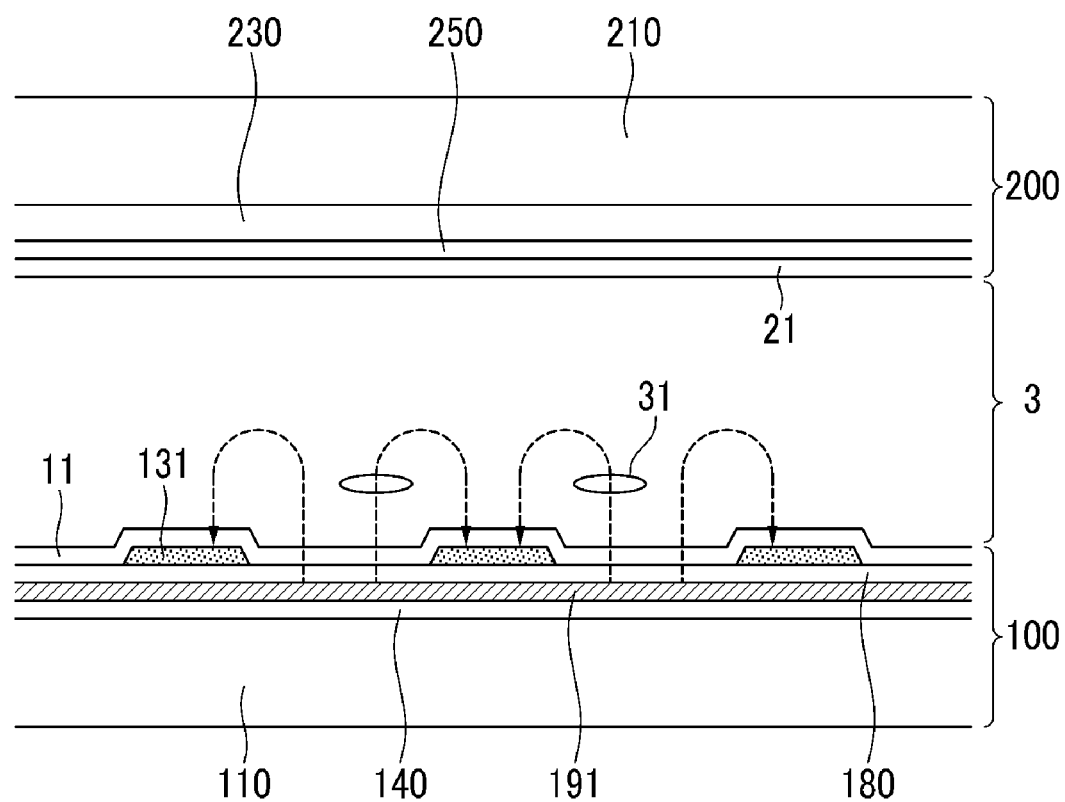
Figure 4:
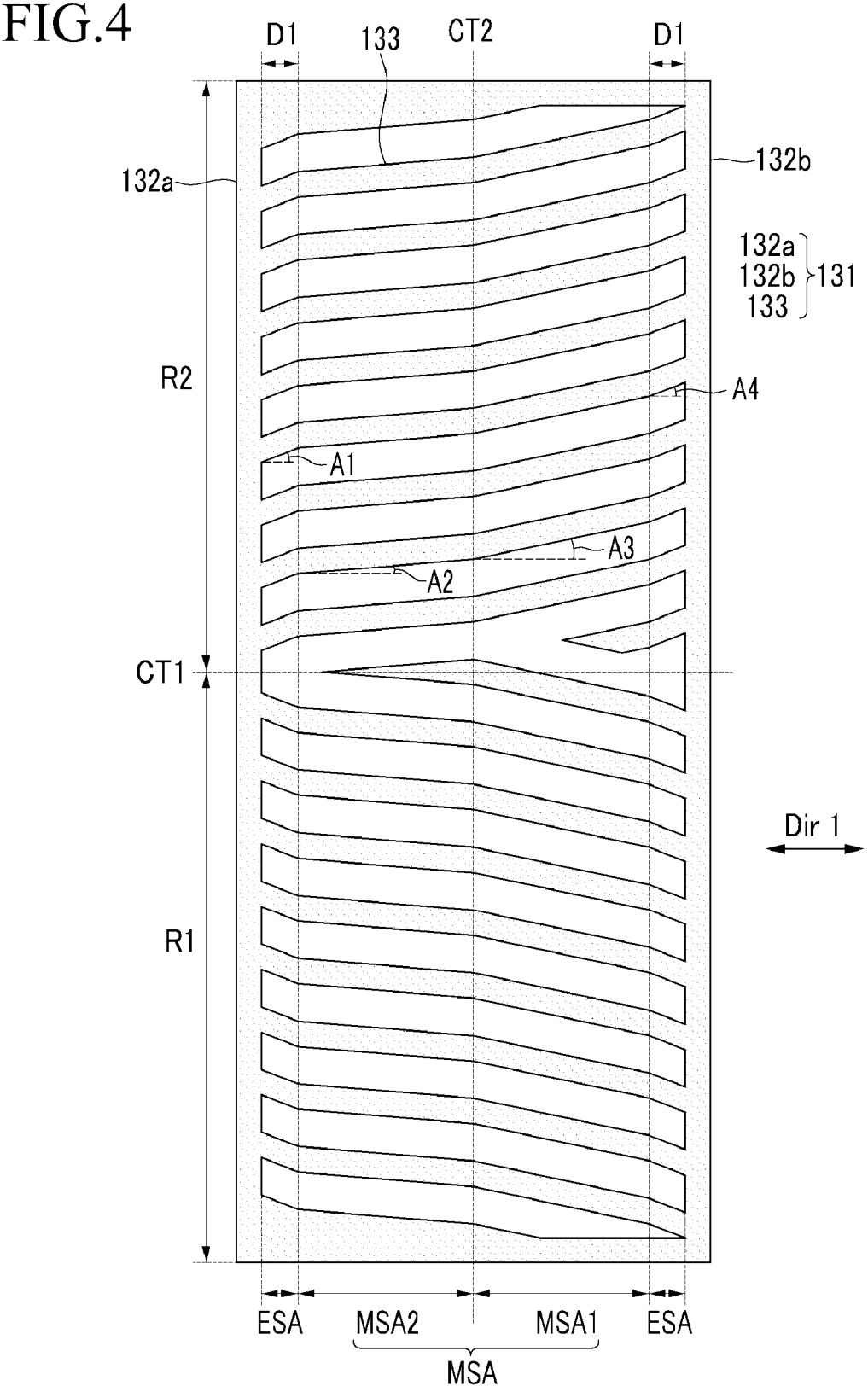
FIG. 4, FIG. 5, FIG. 6, FIG. 7, FIG. 8, FIG. 9, and FIG. 10 are plan views showing a common electrode of a liquid crystal display according to an exemplary embodiment of the present invention.
Figure 5:
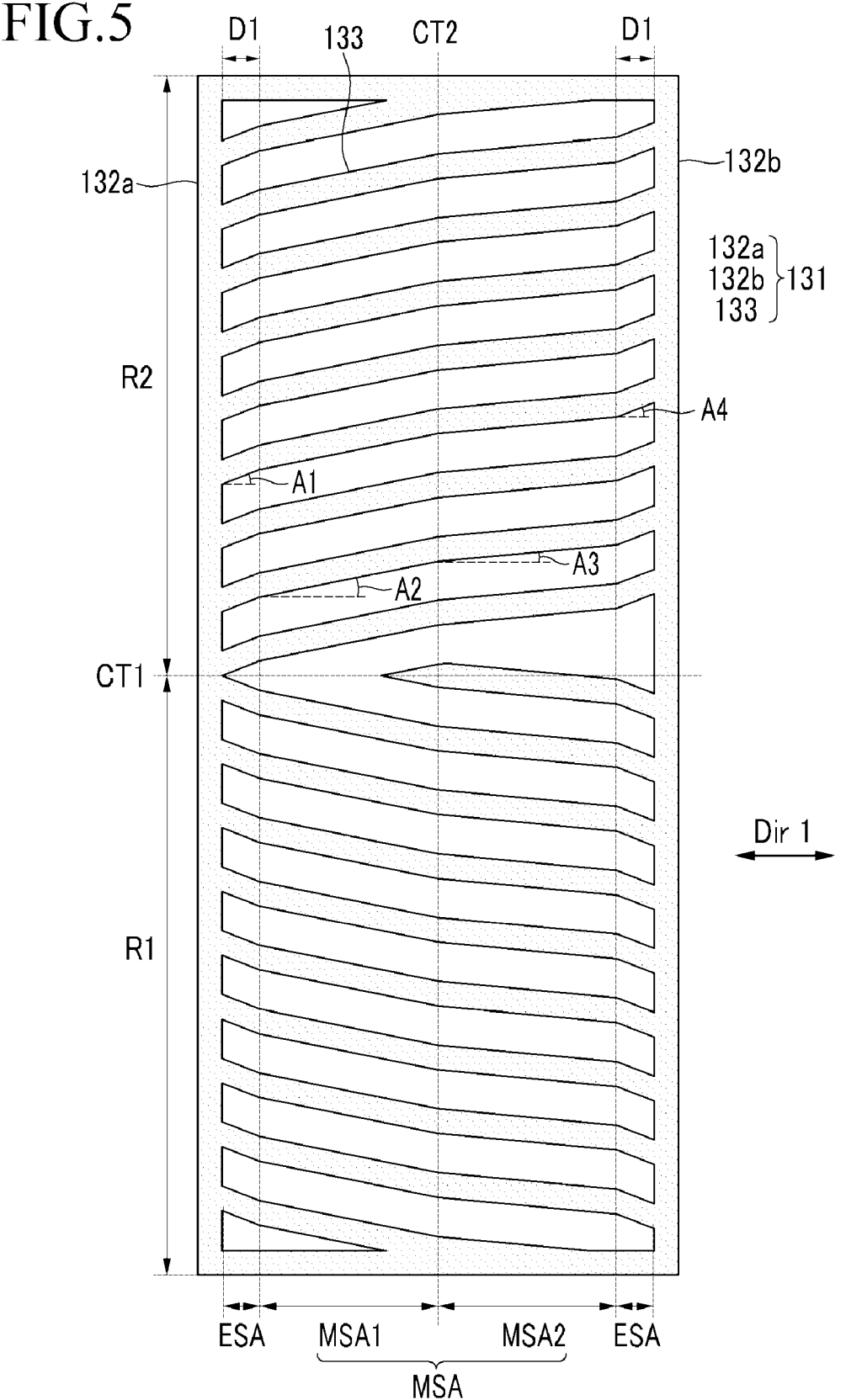

FIG. 1 is a layout view of one pixel of a liquid crystal display according to an exemplary embodiment of the present invention. FIG. 2 and FIG. 3 are cross-sectional views of the liquid crystal display taken along lines II-II and III-III of FIG. 1, respectively. FIG. 4 is a plan view showing a common electrode of the liquid crystal display shown in FIG. 1, and FIG. 5 is a plan view showing a common electrode of a liquid crystal display according to another exemplary embodiment of the present invention.

A liquid crystal display according to an exemplary embodiment of the present invention includes a lower panel 100, an upper panel 200, and a liquid crystal layer 3 interposed between the lower and upper panels 100 and 200.

First, the upper panel 200 will be described. A light blocking member 220 and color filters 230 are formed on an insulating substrate 210. The light blocking member 220 defines an opening area that transmits light. Most of the color filers 230 are provided within an area surrounded by the light blocking member 220, and each color filter 230 may display a primary color such as red, green, and blue. An overcoat 250 may be formed on the light blocking member 220 and the color filters 230.

The liquid crystal layer 3 interposed between the lower panel 100 and the upper panel 200 includes liquid crystal molecules 31. When an electric field is not applied across the liquid crystal layer 3, the liquid crystal molecules 31 may be aligned so that the long axis thereof is horizontal to the surfaces of the two panels 100 and 200.

Hereinafter, the lower display panel 100 will be described.

A plurality of gate conductors including a plurality of gate lines 121 and a plurality of common voltage lines 125 are formed on the insulating substrate 110.

The gate lines 121 transfer gate signals and extend substantially in a horizontal direction. Each gate line 121 includes a plurality of gate electrodes 124 that protrude from the gate line 121.

The common voltage line 125 transfers a voltage such as common voltage Vcom, extend substantially in the horizontal direction, and may be substantially parallel to the gate lines 121. Each common voltage line 125 may include a plurality of extension portions 126.

A gate insulating layer 140 is formed on the gate conductors 121 and 125. The gate insulating layer 140 may be made of an inorganic insulating material such as silicon nitride (SiNx) or silicon oxide (SiOx).

A plurality of stripe-type semiconductors (not shown) may be formed on the gate insulating layer 140. The stripe-type semiconductors may extend substantially in a vertical direction, and a plurality of semiconductor protruding portions 154 may extend toward the gate electrode 124 therefrom.

A plurality of stripe-type ohmic contacts (not shown) and a plurality of island ohmic contacts 165 may be formed on the stripe-type semiconductors. The stripe-type ohmic contacts have a plurality of protruding portions 163 extending toward the gate electrode 124, and the protruding portions 163 and the island ohmic contacts 165 form a pair that face each other around the gate electrode 124 on the semiconductor protruding portions 154. The ohmic contacts 163 and 165 may be made of a material such as n+ hydrogenated amorphous silicon that may be doped with n-type impurities such as phosphorus with high concentration or silicide.

A data conductor including a plurality of data lines 171 and a plurality of drain electrodes 175 are formed on the ohmic contacts 163 and 165.

The data lines 171 transfer data signals and extend substantially in a vertical direction to cross the gate lines 121 and the common voltage lines 125. Data line 171 includes a plurality of source electrodes 173 extending toward the gate electrode 124.

The drain electrode 175 includes a bar-shaped end facing the source electrode 173 positioned above the gate electrode 124 and another end having a larger area.

The gate electrode 124, the source electrode 173, the drain electrode 175 and the semiconductor protruding portion 154 form a thin film transistor (TFT) Q as a switching element. The stripe-type semiconductor may have substantially the same planar shape as the data line 171, the drain electrode 175, and the ohmic contacts 163 and 165 on the bottom thereof, except for the semiconductor protruding portion 154 at which the thin film transistor is positioned.

A pixel electrode 191 is formed on the data conductors 171 and 175 and the exposed semiconductor protruding portion 154. The pixel electrode 191 may be made of a transparent conductive material such as ITO, IZO, or the like.

The pixel electrode 191 is positioned just above the drain electrode 175 of the thin film transistor Q to directly contact the drain electrode 175 while covering a part of the drain electrode 175 and includes a part contacting the gate insulating layer 140. The pixel electrode 191 receives data voltage from the drain electrode 175.

The pixel electrode 191 may be planar and may fill most of the region bounded by the gate line 121 and the data line 171. The overall shape of the pixel electrode 191 may be a rectangle with its sides substantially parallel to the gate line 121 and the data line 171. The edges nearest the pixel electrode's thin film transistor Q may be chamfered as shown in FIG. 1, but the shape thereof is not limited thereto.

A passivation layer 180 is formed on the pixel electrode 191, the data conductors 171 and 175, and the exposed semiconductor protruding portion 154. The passivation layer 180 may be made of an inorganic or an organic insulating material. A plurality of contact holes 181 exposing a part of the common voltage line 125, e.g., a part of the extension portion 126, is formed on the passivation layer 180 and the gate insulating layer 140.

A plurality of common electrodes 131 are formed on the passivation layer 180. The common electrode 131 may be made of a transparent conductive material such as ITO, IZO, or the like.

Referring to FIG. 4, each common electrode 131 includes a first outer stem portion 132a, a second outer stem portion 132b, and a plurality of branch electrodes 133 positioned between the first outer stem portion 132a and the second outer stem portion 132b.

The first outer stem portion 132a and the second outer stem portion 132b extend substantially in a vertical direction and extend substantially parallel to the data line 171. Additionally, the first outer stem portion 132a or the second outer stem portion 132b may be omitted.

The branch electrode 133 extends from the first outer stem portion 132a to the second outer stem portion 132b, and both sides of the branch electrode 133 form an oblique angle with respect to a horizontal direction, i.e., the direction that gate lines 121 substantially extend. The direction in which the sides of the branch electrode 133 extend is referred to as a direction in which the branch electrode 133 extends or a direction of the branch electrode 133. Further, a direction in which the gate lines 121 substantially extend, i.e., the horizontal direction in FIG. 1 is referred to as a first direction Dir1. When an angle is designated, it is an acute angle rather than an obtuse angle.

The branch electrode 133 includes a pair of boundary regions ESA that may be directly adjacent to the first and second outer stem portions 132a and 132b and a main region MSA positioned between the pair of boundary regions ESA.

The width or length D1 of the boundary region ESA in the first direction Dirt may be greater than or equal to the spatial resolution of a light exposure used to form the common electrode 131 and may be equal to or less than 10 μm. Further, in the boundary region ESA, angles A1 and A4 that the branch electrode 133 forms with the first direction Dir1 may be equal to or greater than 15° and equal to or less than 30°. Two angles A1 and A4 in the pair of boundary regions ESA may be the same as or different than each other.

Without the boundary regions ESA, the liquid crystal molecules 31 in an outer boundary area of the main region MSA, that is in the vicinity of the first and second outer stem portions 132 and 132b, may be apt to counter-twist to align away from the alignment in the main region MSA close to the first direction Dir1. Accordingly, such counter-twistedly aligned liquid crystal molecules 31 may affect the liquid crystal molecules 31 in the main region MSA and texture may be generated. By forming boundary regions ESA according to the present exemplary embodiment, however, the alignment of the liquid crystal molecules of the liquid crystal layer 3 may be controlled at a boundary portion of the common electrode 131, and the control may prevent neighboring ensembles of liquid crystal molecules from forming counter-twisted alignments so that texture generation may be prevented.

The main region MSA may be divided into a plurality of regions according to an angle at which the branch electrode 133 forms with respect to the first direction Dir1. For example, the main region MSA may be divided into two regions. In the exemplary embodiment shown in FIG. 1, FIG. 2, FIG. 3, FIG. 4, and FIG. 5, the main region MSA is divided into a first main region MSA1 and a second main region MSA2 with the boundary being a virtual vertical central line CT2 of the common electrode 131. In the exemplary embodiment shown in FIG. 4, an angle A2 at which the first main region MSA1 forms with the first direction Dir1 is less than an angle A3 at which the second main region MSA2 forms with the first direction Dir1. For example, the angle A2 may be greater than 0° and less than 10°, and the angle A3 may be greater than 10° and less than 15°. In another exemplary embodiment, the common electrode 131 may have a structure shown by the exemplary embodiment in FIG. 5. That is, the angle A2 at which the first main region MSA1 forms with the first direction Dir1 may be larger than the angle A3 at which the second main region MSA2 forms with the first direction Dir1. For example, the angle A2 may be greater than 10° and less than 15°, and the angle A3 may be greater than 0° and less than 10°.

Unlike the exemplary embodiment shown in FIG. 1, FIG. 2, FIG. 3, FIG. 4, and FIG. 5, the main region MSA of the common electrode 131 may be divided into three or more regions having at least three different angles at which the branch electrodes 133 forms with the first direction Dir1, and the boundaries between neighboring regions of the three or more regions may be substantially parallel to the longitudinal direction. In this case, the angle formed by the branch electrode 133 in the three or more regions with respect to the first direction Dir1 may gradually vary in the three or more consecutive regions. That is, the angle at which the first direction Dir1 forms with the branch electrode 133 may gradually increase or decrease according to the order of the dispositions of the regions.

Meanwhile, the common electrode 131 is divided into two or more domains according to a slant direction (upward or downward) of the branch electrodes 133 with respect to the first direction Dir1. In the exemplary embodiment shown in FIG. 1, FIG. 2, FIG. 3, FIG. 4, and FIG. 5, the common electrode 131 is divided into a first domain R1 and a second domain R2. The boundary between the first domain R1 and the second domain R2 may be the virtual horizontal central line CT1 of the common electrode 131 as shown in FIG. 4 and FIG. 5. The branch electrode 133 of the first domain R1 extends downward with respect to the first direction Dir1, and the branch electrode 133 of the second domain R2 extends upward with respect to the first direction Dir1. The common electrode 131 may be symmetric with respect to the virtual horizontal central line CT1. As described above, by dividing the common electrode 131 into a plurality of domains where the branch electrodes 133 have different slant directions, the inclination directions of the liquid crystal molecules 31 of the liquid crystal layer 3 may be diversified to increase a reference viewing angle of the liquid crystal display.

The common electrode 131 receives a predetermined voltage such as common voltage Vcom from the common voltage line 125 through the contact hole 181.

Referring again to FIG. 2 and FIG. 3, alignment layers 11 and 21 are applied to the inner surfaces of lower and upper panels 100 and 200, and the alignment layers 11 and 21 may be horizontal alignment layers. In the exemplary embodiment of FIG. 4 and FIG. 5, the alignment directions of the alignment layers 11 and 21 may be parallel to the first direction Dir1. As a result, the liquid crystal molecules 31 of the liquid crystal layer 3 may be initially aligned substantially parallel to the first direction Dir1.

The pixel electrode 191 receives the data voltage through the thin film transistor Q, and the common electrode 131 receives the common voltage Vcom. Under these conditions, an electric field is generated in the liquid crystal layer 3 by the two field generating electrodes 191 and 131 to determine directions of the liquid crystal molecules 31 of the liquid crystal layer 3, and an image is displayed. In particular, since the pixel electrode 191 has substantially the same planar shape in a display region which is bounded by the data line 171 and the gate line 121, the directions of the liquid crystal molecules 31 can be controlled in almost all display regions other than a portion in the vicinity of the central line CT2 bisecting the branch electrode 133 of the common electrode 131 in its extending direction by the electric field indicated by the arrow in FIG. 3, and thus, the transmittance of the liquid crystal display may be improved.

As described in the exemplary embodiment of the present invention, by forming a plurality of regions having different angles at which the branch electrode 133 of the common electrode 131 forms with the first direction Dir1 in which the gate line 121 extends, it is possible to maximize the response speed of the liquid crystal molecules 31 while improving the transmittance of the liquid crystal display. For example, in a region (the second main region MSA2 of FIG. 4, the second main region MSA2 of FIG. 5) in which an angle at which the branch electrode 133 forms with the first direction Dir1 is relatively small, the transmittance is relatively high, and in a region (the first main region MSA1 of FIG. 4, the first main region MSA1 of FIG. 5) in which an angle at which the branch electrode 131 forms with the first direction Dir1 is relatively large, the response speed of the liquid crystal molecules is relatively large. Accordingly, when the angles A2 and A3 at which the branch electrode 133 is inclined are appropriately controlled, the transmittance and the response speed of the liquid crystal display may both be high.

Also, the boundary region ESA of the branch electrode 133 that is smaller than the main region MSA may reduce textures that are generated when the liquid crystal molecules have opposing orientations due to not being controlled near boundary portions of the common electrode 131 and the pixel electrode 191.

Next, referring to FIG. 6 and FIG. 1, FIG. 2, and FIG. 3, a liquid crystal display according to another exemplary embodiment of the present invention will be described. The same reference numerals refer to the same elements as the elements in the previous exemplary embodiment so that duplicated description may be omitted.

Figure 6:
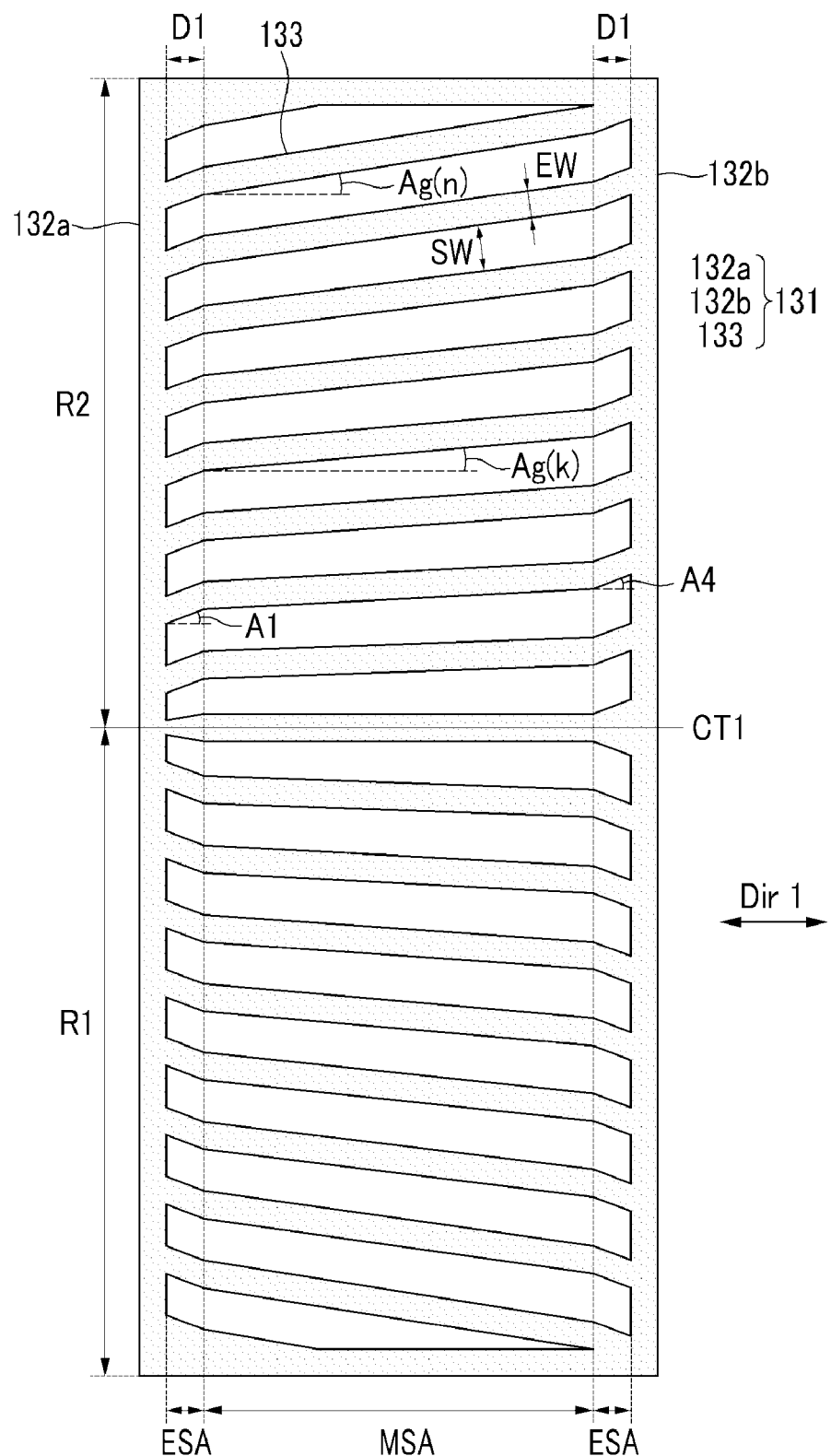

FIG. 6 is a plan view showing a common electrode of a liquid crystal display according to an exemplary embodiment of the present invention.

The liquid crystal display according to the present exemplary embodiment is substantially the same as the exemplary embodiment shown in FIG. 1, FIG. 2, and FIG. 3.

The common electrode 131 according to the present exemplary embodiment shown in FIG. 6 includes a first outer stem portion 132a, a second outer stem portion 132b, and a plurality of branch electrodes 133 positioned therebetween.

The first outer stem portion 132a and the second outer stem portion 132b extend substantially in a vertical direction and extend substantially parallel to the data line 171. The branch electrodes 133 extend to the second outer stem portion 132b from the first outer stem portion 132a. The first outer stem portion 132a or the second outer stem portion 132b may be omitted.

In the present exemplary embodiment, the plurality of branch electrodes 133 are divided into a pair of boundary regions ESA adjacent to the first and second outer stem portions 132a and 132b and a main region MSA positioned therebetween. Since features of the boundary regions ESA are substantially the same as previous exemplary embodiments described above, detailed descriptions thereof may be omitted.

The angle at which the branch electrode 133 forms with the first direction Dir1 in the main region MSA gradually varies from a reference line, e.g., virtual horizontal central line CT1. With the virtual horizontal central line CT1 as the reference line as shown in FIG. 6, the branch electrode 133 positioned at the reference line forms 0° with the first direction Dir1, and angles Ag(k) (k=1, . . . , n) at which the branch electrodes 133 form with the first direction Dir1 may increase by a predetermined angle going upward or downwards from the reference line CT1. Herein, n indicates the number of the branch electrodes 133 positioned above or below the virtual horizontal central line CT1. The angle Ag(n) formed by the uppermost branch electrode 133 or the lowermost branch electrode 133 with respect to the first direction Dir1 may be less than 15°. Therefore, a difference, which may be uniform, between angles at which adjacent branch electrodes 133 form with the first direction Dir1 may be smaller than 15/n.

Meanwhile, the width EW of each of the branch electrodes 133 may be constant in the main region MSA, but the gap SW between adjacent branch electrodes 133 may vary by widening the gap SW proceeding from a left-to-right direction in FIG. 6.

Meanwhile, the common electrode 131 is divided into two or more domains according to a slant direction (upward or downward) in which the branch electrodes 133 are inclined with respect to the first direction Dir1. In the exemplary embodiment shown in FIG. 6, the common electrode 131 is divided into a first domain R1 and a second domain R2. A boundary between the first domain R1 and the second domain R2 may be the virtual horizontal central line CT1 of the common electrode 131. The branch electrode 133 of the first domain R1 extends downwards with respect to the first direction Dir1, and the branch electrode 133 of the second domain R2 extends upwards with respect to the first direction Dir1. The common electrode 131 may be symmetric about the virtual horizontal central line CT1.

As described in the present exemplary embodiment, when the angles at which the branch electrodes 133 of the common electrode 131 form with the first direction Dir1 gradually vary from the reference line such as the virtual horizontal central line CT1, the inclination directions of the liquid crystal molecules 31 in the vicinity of the reference line continuously vary. Therefore, texture such as a dark line may disappear. In detail, in the exemplary embodiment shown in FIG. 6, the inclination directions of the liquid crystal molecules 31 are continuous in a boundary region between the two domains R1 and R2 in which the slant directions of the branch electrodes 133 are opposite to each other with the virtual horizontal central line CT1 as a reference line, and as a result, the boundary between the two domains R1 and R2 may substantially disappear. Accordingly, it is possible to reduce a display deterioration such as a dark line generated when light cannot transmit at the boundary of the two domains R1 and R2.

Further, since the angles Ag(k) at which the branch electrodes 133 form with the first direction Dir1 vary over the whole common electrode 131, it may be possible to further improve the response speed of the liquid crystal molecules while improving the transmittance of the liquid crystal display.

Next, referring to FIG. 7 and FIG. 1, FIG. 2, and FIG. 3, a liquid crystal display according to another exemplary embodiment of the present invention will be described. The same reference numerals refer to the same elements as the elements in the previous exemplary embodiment so repeated descriptions may be omitted.

Figure 7:
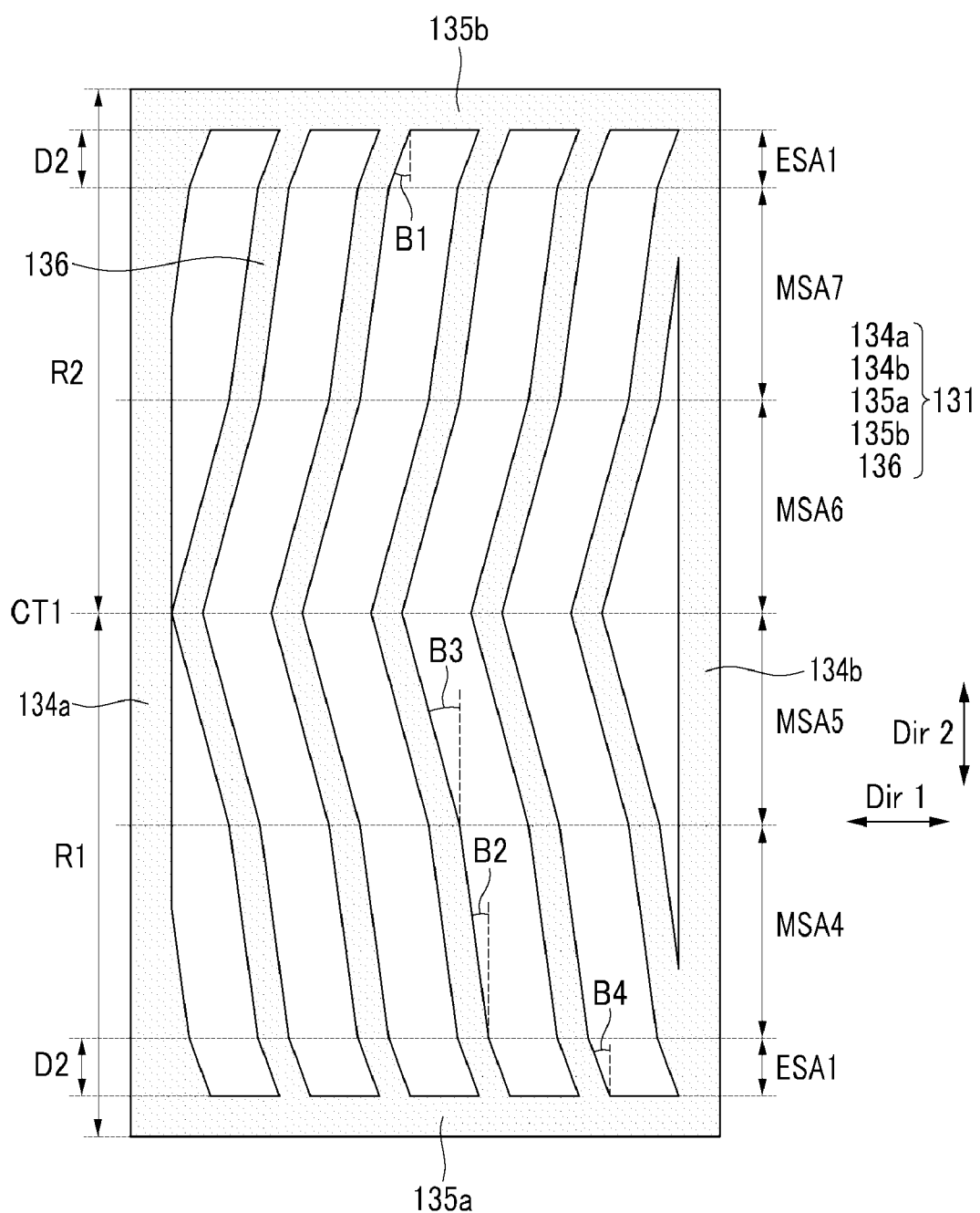

FIG. 7 is a plan view showing a common electrode of a liquid crystal display according to an exemplary embodiment of the present invention.

The liquid crystal display according to the present exemplary embodiment is substantially the same as the exemplary embodiment shown in FIG. 1, FIG. 2, and FIG. 3, except for the structure of the common electrode 131 of FIG. 7.

The common electrode 131 according to the exemplary embodiment shown in FIG. 7 includes a left outer stem portion 134a, a right outer stem portion 134b, a lower outer stem portion 135a, an upper outer stem portion 135b, and a plurality of branch electrodes 136 positioned in a region surrounded by outer stem portions 134a, 134b, 135a, and 135b.

Four outer stem portions 134a, 134b, 135a, and 135b form a rectangular shape. However, the shape of the common electrode 131 is not limited thereto, and the left outer stem portion 134a and the right outer stem portion 134b may be omitted. Also, the lower outer stem portion 135a or the upper outer stem portion 135b may be omitted.

The branch electrodes 136 extend to the upper outer stem portion 135b from the lower outer stem portion 135a. In the exemplary embodiment, the plurality of branch electrodes 136 are divided into a pair of boundary regions ESA1 adjacent to the lower and upper outer stem portions 135a and 135b and a main region (MSA4, MSA5, MSA6, MSA7) positioned therebetween.

The width D2 of the boundary region ESA1 may be equal to or greater than the spatial resolution of a light exposure used to form the common electrode 131 and equal to or less than 10 μm. Further, in the boundary region ESA1, angles B1 and B4 at which the branch electrodes 136 form with a second direction Dir2 perpendicular to the first direction Dir1 may range from 15° to 30°. The two angles B1 and B4 of the pair of boundary regions ESA1 may be he same as each other but may be different from each other. Various features and effects of the boundary region ESA of the exemplary embodiment of FIG. 1, FIG. 2, FIG. 3, FIG. 4, FIG. 5, and FIG. 6 described above may be applied to the boundary region ESA1 according to the exemplary embodiment of the present invention.

The main region (MSA4, MSA5, MSA6, MSA7) is divided into a plurality of regions according to that angle at which the branch electrode 136 forms with the second direction Dir2. Referring to FIG. 7, the main region (MSA4, MSA5, MSA6, MSA7) is divided into two regions with respect to the virtual horizontal central line CT1 of the common electrode 131, and each region is again divided into a first main region MSA4, a second main region MSA5, a third main region MSA6, and a fourth main region MSA7. An angle B2 at which the first main region MSA4 and the fourth main region MSA7 form with the second direction Dir2 may be greater than 0° and less than 10°, and an angle B3 at which the second main region MSA5 and the third main region MSA6 form with the second direction Dir2 may be greater than 10° and less than 15°. However, the magnitudes of the angles B2 and B3 may be reversed.

The common electrode 131 is divided into a first domain R1 and a second domain R2 with respect to the virtual horizontal central line CT1. The branch electrode 136 of the first domain R1 extends downwards with respect to the first direction Dir1, and the branch electrode 136 of the second domain R2 extends upwards with respect to the first direction Dir1. The common electrode 131 may be symmetric with respect to the virtual horizontal central line CT1.

Various features of the common electrode 131 according to above-described exemplary embodiments may be applied to the common electrode 131 of the liquid crystal display according to the present exemplary embodiment.

Hereinafter, a liquid crystal display according to another exemplary embodiment of the present invention will be described with reference to FIG. 8, FIG. 9, and FIG. 10. The same reference numerals refer to the same elements as the elements in the previous exemplary embodiments so repeated descriptions may be omitted.

Figure 8:
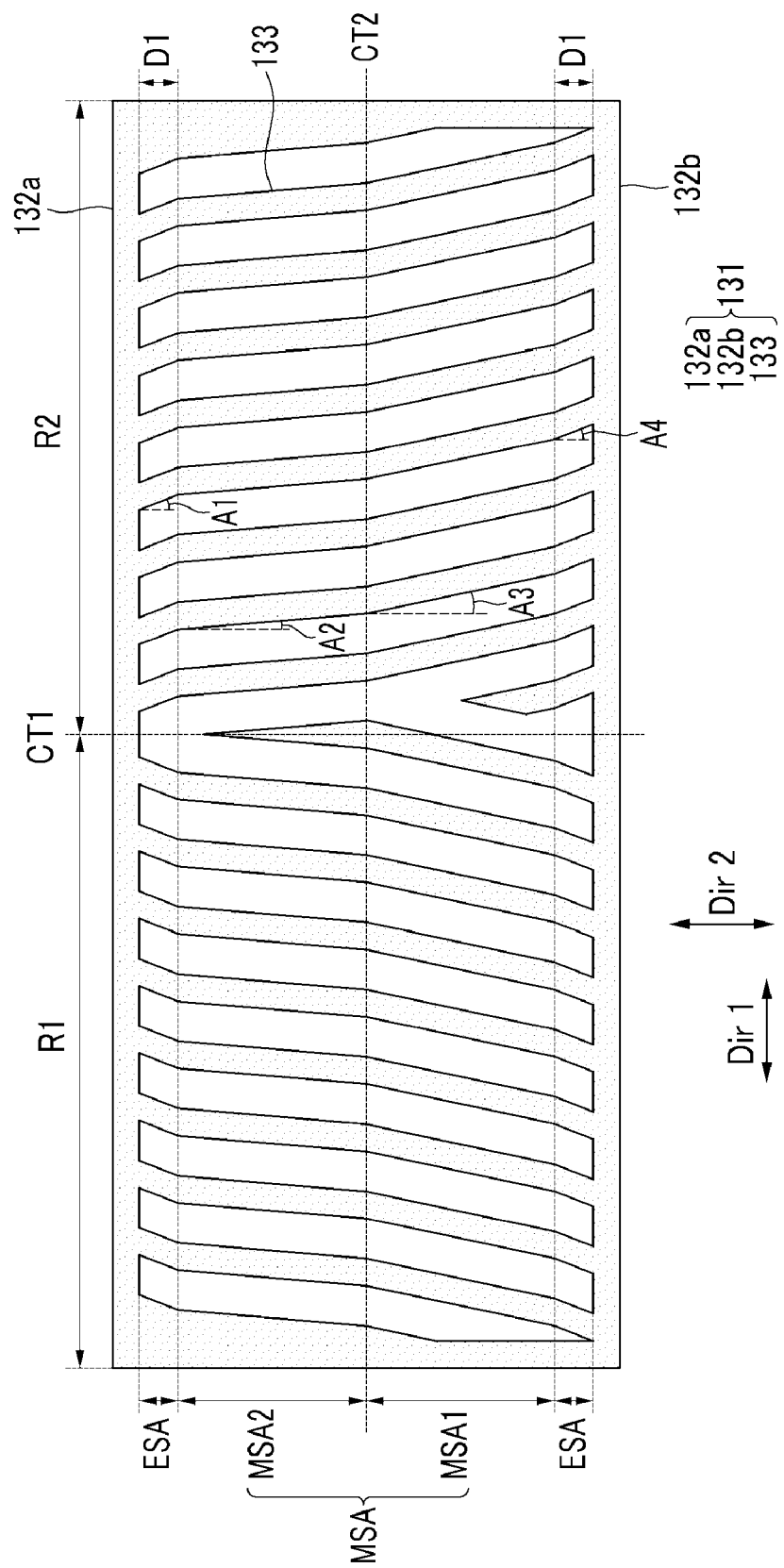
Figure 9:
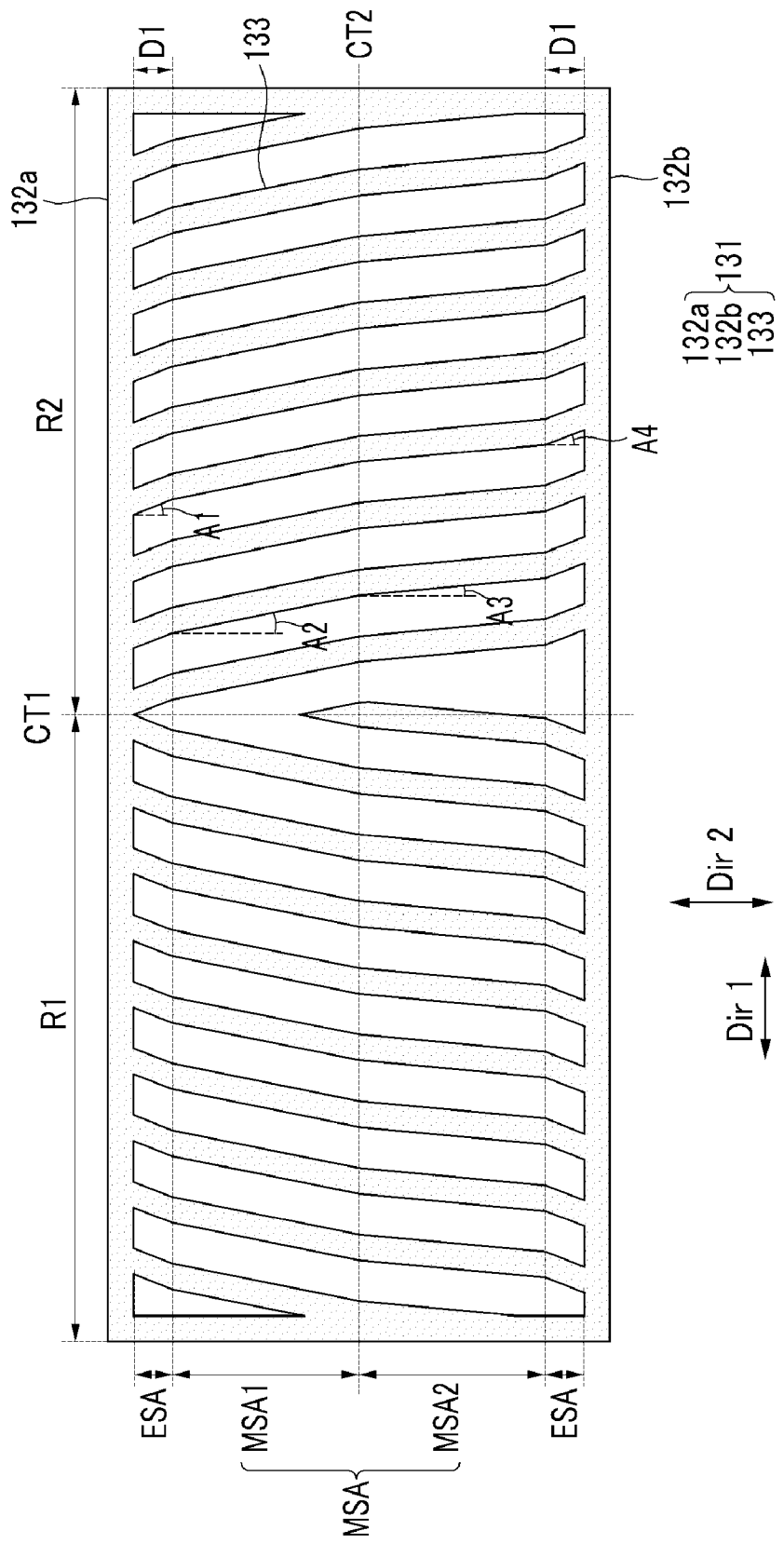
Figure 10:
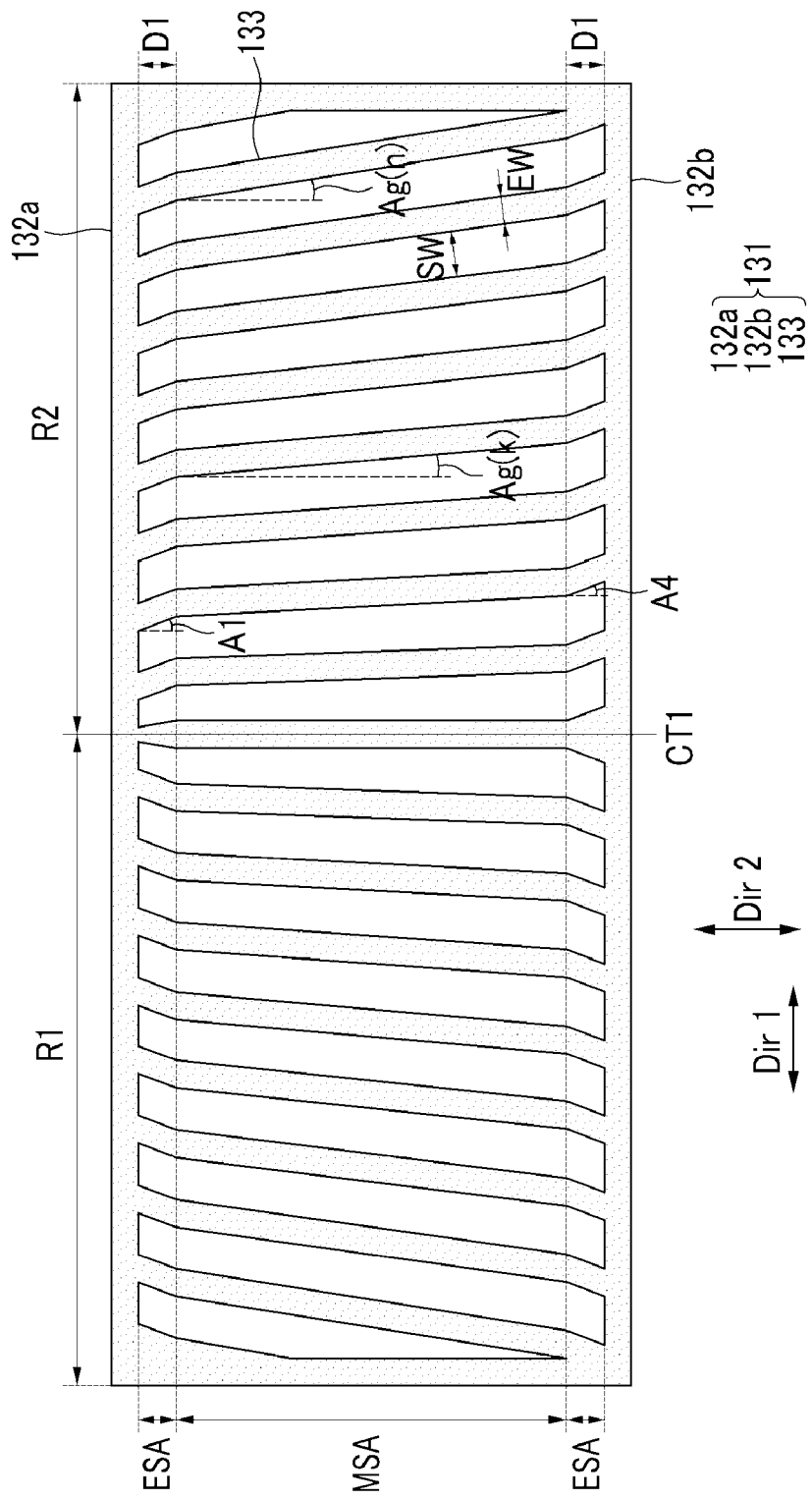

FIG. 8, FIG. 9, and FIG. 10 are plan views showing a common electrode of a liquid crystal display according to an exemplary embodiment of the present invention.

Although not shown in the figures, the liquid crystal display according to the exemplary embodiment is substantially the same as the liquid crystal display shown in FIG. 1, FIG. 2, FIG. 3, FIG. 4, FIG. 5, and FIG. 6. However, the pixel electrode 191 and the common electrode 131 have a rectangular shape with a horizontal major axis instead of a vertically major axis as in previous exemplary embodiments. The common electrode 131 according to the exemplary embodiment shown in FIG. 8, FIG. 9, and FIG. 10 has the same structure as a structure in which the common electrode 131 shown in FIG. 4, FIG. 5, and FIG. 6, except the present embodiment is rotated clockwise by 90°. Therefore, repeated descriptions may be omitted.

However, in the exemplary embodiment, an alignment direction of an alignment layer (not shown) may be a vertical direction, i.e., a second direction Dir2 close to a direction in which a branch electrode 133 extends. In addition, although "CT1" and "CT2" represented the virtual horizontal central line and the virtual vertical central line of the common electrode 131, respectively in the exemplary embodiment of FIG. 1, FIG. 2, FIG. 3, FIG. 4, FIG. 5, and FIG. 6 above, "CT1" and "CT2" represent the virtual vertical central line and the virtual horizontal central line of the common electrode 131, respectively in the present exemplary embodiment. Further, the reference direction for describing an inclination angle of the branch electrode 133 is the second direction Dir2 perpendicular to the first direction Dir1. In the present exemplary embodiment, the second direction Dir2 is substantially parallel to a direction in which the plurality of data lines 171 extend. Additional terms associated with the features that are affected by rotating the exemplary embodiment shown in FIG. 1, FIG. 2, FIG. 3, FIG. 4, FIG. 5, and FIG. 6 to achieve the present exemplary embodiment may be appropriately changed.

Next, referring to FIG. 1, FIG. 2, FIG. 3, FIG. 11, and FIG. 12, a liquid crystal display according to another exemplary embodiment of the present invention will be described.

Figure 11:
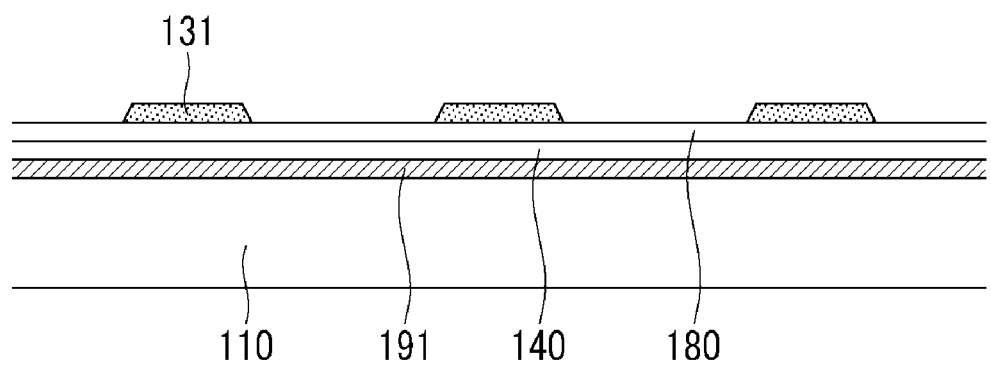
FIG. 11 and FIG. 12 are cross-sectional views of a liquid crystal display according to an exemplary embodiment of the present invention.
Figure 12:
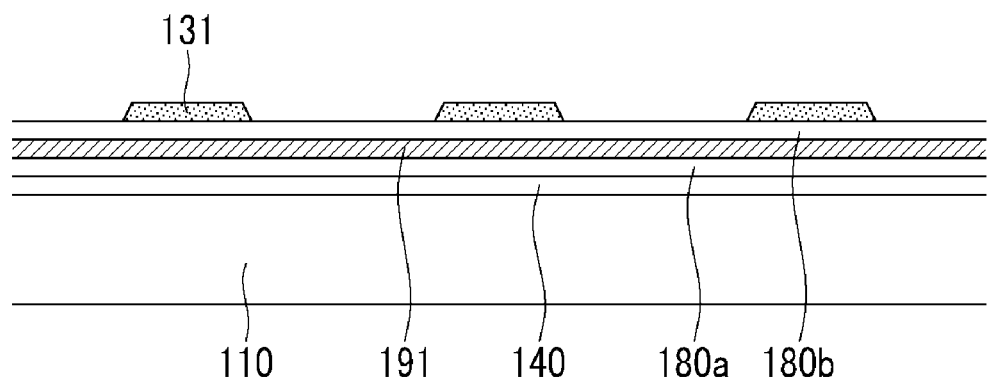

FIG. 11 and FIG. 12 are cross-sectional views of a liquid crystal display according to an exemplary embodiment of the present invention.

Referring to FIG. 11, the exemplary embodiment is substantially the same as the exemplary embodiment of FIG. 1, FIG. 2, and FIG. 3 described above, but the pixel electrode 191 is positioned directly above the substrate 110 with a gate insulating layer 140 positioned on the pixel electrode (FIG. 11). In this case, the pixel electrode 191 may receive data voltage from the thin film transistor through a contact hole (not shown) formed on the gate insulating layer 140. Further, referring to FIG. 12, the exemplary embodiment is substantially the same as the exemplary embodiment of FIG. 1, FIG. 2, and FIG. 3, but a first passivation layer 180a is positioned on the drain electrode 175, and the pixel electrode 191 is positioned thereon. The pixel electrode 191 may receive data voltage from the drain electrode 175 through a contact hole (not shown) formed on the first passivation layer 180a. The common electrode 131 may be positioned on a second passivation layer 180b formed on the pixel electrode 191.

In the exemplary embodiment described up to now, the common electrode 131 is positioned on the planar pixel electrode 191 with respect to the substrate 110, and the common electrode 131 has the plurality of branch electrodes 133 and 136. In another exemplary embodiment, the pixel electrode having the plurality of branch electrodes may be positioned on the planar common electrode. In this case, the features of the common electrode in several exemplary embodiments described above may be applied to the pixel electrode. Here also, the common electrode receiving the common voltage and the pixel electrode receiving the data voltage form an electric field through the liquid crystal layer 3 to control the inclined directions of the liquid crystal molecules 31.

Hereinafter, a method of manufacturing a lower panel of a liquid crystal display according to an exemplary embodiment according to an exemplary embodiment of the present invention will be described with reference to FIG. 13 in addition to FIG. 1, FIG. 2, and FIG. 3 described above.

Figure 13:
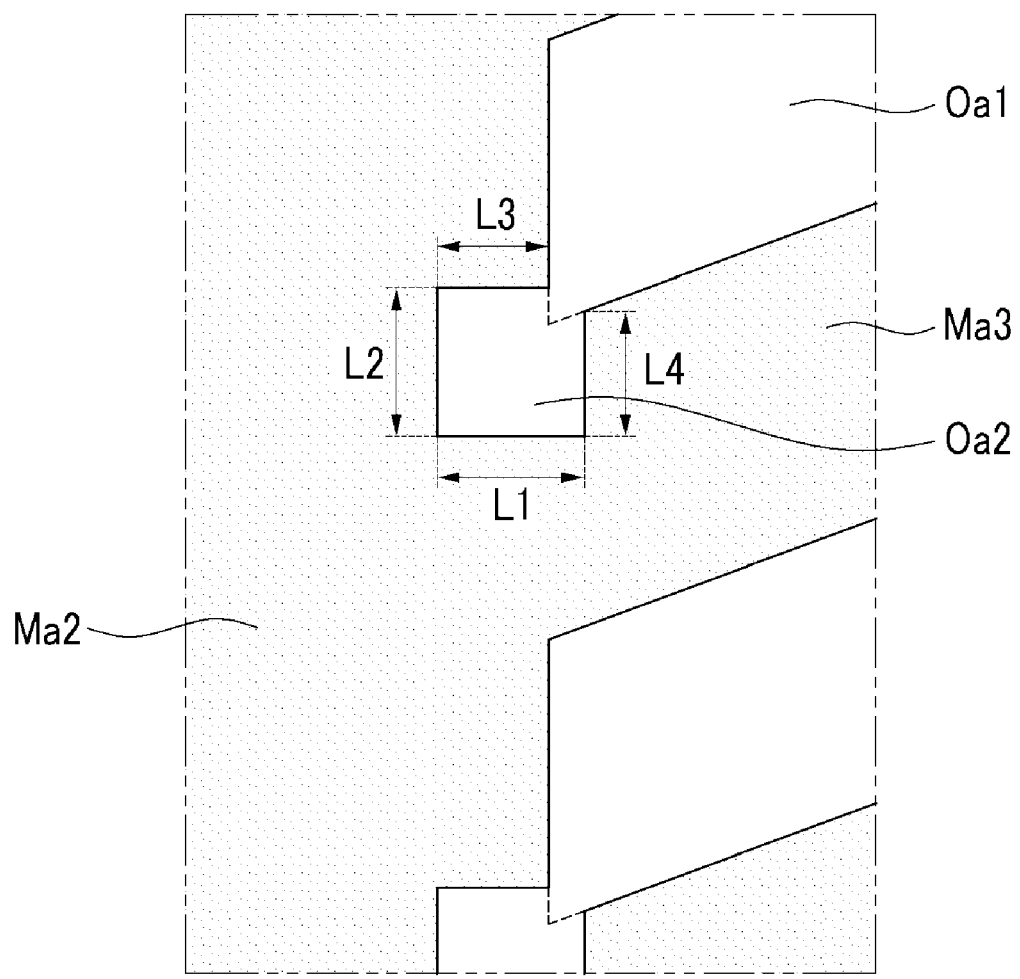
FIG. 13 is a diagram showing an exposure mask used to form a pixel electrode or a common electrode of a liquid crystal display according to an exemplary embodiment of the present invention.

FIG. 13 is a diagram showing an exposure mask used to form a pixel electrode or a common electrode of a liquid crystal display according to an exemplary embodiment of the present invention.

First, the plurality of gate conductors 121 and 125 including the plurality of gate lines 121 with gate electrodes 124 and the plurality of common voltage lines 125 with extension portions 126 are formed on the insulating substrate 110, and the gate insulating layer 140 is disposed thereon. Next, the semiconductors 154, the ohmic contacts 163 and 165, and the data lines 171 including the source electrodes 173, and the drain electrodes 175 are formed on the gate insulating layer 140. Next, a transparent conductive material such as ITO, IZO, or the like is laminated and etched on the data lines 171 and the drain electrodes 175 to form the plurality of planar pixel electrodes 191. Next, the passivation layer 180 is formed on the pixel electrode 191 by laminating an inorganic or organic insulating material, and the contact hole 181 is formed.

Next, the transparent conductive material such as ITO, IZO, or the like is laminated on the passivation layer 180 and a photoresist film is applied. Subsequently, a photoresist film pattern is formed by exposing the photoresist film through an exposure mask.

When the photoresist film has positive photosensitivity in which a part to which light is irradiated is removed, the exposure mask of portions corresponding to the first outer stem portion 132a, the second outer stem portion 132b, and the plurality of branch electrodes 133 of the common electrode 131 may be opaque and the rest of the portions may be transparent.

Referring to FIG. 13, a first opaque portion Ma2, which is the opaque portion of the exposure mask, substantially corresponds to the first and second outer stem portions 132a and 132b of the common electrode 131, and a second opaque portion Ma3 corresponds to the branch electrode 133 of the common electrode 131. The transparent portion of the exposure mask includes a first transparent portion Oa1 and a second transparent portion Oa2.

The first transparent portion Oa1 corresponds to the space between two adjacent branch electrodes 133 among the plurality of branch electrodes of the common electrode 131, and the second transparent portion Oa2 is connected to a vertex of a corner forming an acute angle among corners of the first transparent portion Oa1. That is, the second transparent portion Oa2 is connected to a corner having the acute angle among the angles formed by the first opaque portion Ma2 and the second opaque portion Ma3.

The second transparent portion Oa2 has four straight boundary sides, and adjacent sides form substantially right angles. The shape of the second transparent portion Oa2 may be a rectangle without one corner or may be a square.

The size of the second transparent portion Oa2 may be beyond the resolution limit of the light exposure. Among the boundary sides of the second transparent portion Oa2, a horizontal length L1 or a vertical length L2 of a side that is not connected with the first transparent portion Oa1 may be greater than or equal to 2 µm and less than the resolution (e.g., 4 µm) of the light exposure. Further, a horizontal length L3 or a vertical length L4 of a side connected with the first transparent portion Oa1 among the boundary sides of the second transparent portion Oa2 may be greater than or equal to 1.5 µm and less than 3.0 µm.

Since the size of the second transparent portion Oa2 is beyond the resolution limit of the light exposure, the patterned photoresist film does not actually have a portion having the same shape as the second transparent portion Oa2. Rather, by forming the second transparent portion Oa2 having a size smaller than the resolution of the light exposure, and located at a corner where a portion of the exposure mask corresponding to the branch electrode 133 and a portion of the exposure mask corresponding to the outer stem portions 132a and 132b meet forming an acute angle as described above, the eventually patterned corner formed by the branch electrode 133 and the outer stem portions 132a and 132b of the common electrode 131 may be sharp instead of blunt. Accordingly, the corners of the space between the branch electrodes 133 may be sharp in a target degree near the boundary region ESA of the common electrode 131. As a result of the sharp corners, the liquid crystal molecules can be effectively controlled in the vicinity of the boundary region of the common electrode 131 so that texture may be reduced, thereby improving the display quality of the liquid crystal display.

In the case in which the photoresist film has negative photosensitivity in which a portion to which light is not irradiated is removed, the transparency of the exposure mask shown in FIG. 13 may be reversed. Thus, the transparency of the second transparent portion Oa2 should be opaque when the photoresist film has negative photosensitivity.

Next, a transparent conductive material layer is etched by using the photoresist film pattern as a mask to thereby form a plurality of common electrodes 131.

In the exemplary embodiment, the exposure mask is used to form the common electrode 131 including the branch electrodes 133, but exemplary embodiments are not limited thereto. That is, even in the exemplary embodiment in which the common electrode has a planar form and the pixel electrode includes the plurality of branch electrodes, the exposure mask described above can be used to form the plurality of branch electrodes of the pixel electrode.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:
a first substrate and a second substrate facing each other;
a liquid crystal layer interposed between the first substrate and the second substrate;
a first electrode disposed on the first substrate, the first electrode having a planar shape; and
a second electrode disposed on the first substrate and comprising a plurality of branch electrodes overlapping the first electrode,
wherein a branch electrode of the plurality of branch electrodes comprises:
a pair of boundary regions disposed at opposing ends of the branch electrode; and
at least two main regions disposed between the pair of boundary regions, the at least two main regions comprise a first main region and a second main region adjacent to each other,
wherein a first angle, formed by the branch electrode in the first main region with respect to a first direction, is different from a second angle formed by the branch electrode in the second main region with respect to the first direction, and a third angle, formed by the branch electrode in the pair of boundary regions with respect to the first direction, is greater than the first angle and the second angle.

2. The liquid crystal display of claim 1, wherein the third angle ranges from 15° to 30°.

3. The liquid crystal display of claim 2, wherein the first angle is greater than 0° and less than 10°, and the second angle is greater than 10° and less than 15°.

4. The liquid crystal display of claim 3, wherein a length of each of the pair of boundary regions in the first direction is less than or equal to 10 μm.

5. The liquid crystal display of claim 4, further comprising a gate line extending in the first direction.

6. The liquid crystal display of claim 4, further comprising a data line extending in the first direction.

7. The liquid crystal display of claim 1, wherein the first angle is greater than 0° and less than 10°, and the second angle is greater than 10° and less than 15°.

8. The liquid crystal display of claim 1, wherein a length of each of the pair of boundary regions in the first direction is less than or equal to 10 μm.

9. The liquid crystal display of claim 1, further comprising a gate line extending in the first direction.

10. The liquid crystal display of claim 1, further comprising a data line extending in the first direction.

11. A liquid crystal display, comprising:
a first substrate and a second substrate facing each other;
a liquid crystal layer interposed between the first substrate and the second substrate;
a first electrode disposed on the first substrate, the first electrode having a planar shape; and
a second electrode disposed on the first substrate and comprising a plurality of branch electrodes overlapping the first electrode,
wherein a branch electrode of the plurality of branch electrodes comprises:
a pair of boundary regions disposed at opposing ends of the branch electrode; and
at least two main regions disposed between the pair of boundary regions, the at least two main regions comprising a first main region and a second main region adjacent to each other,
wherein a first angle, formed by the branch electrode in the first main region with respect to a first direction, is different from a second angle formed by the branch electrode in the second main region with respect to the first direction, and
a length of each of the pair of boundary regions in the first direction is less than or equal to 10 μm.

12. The liquid crystal display of claim 11, wherein a third angle, formed by the branch electrode in the pair of boundary regions with the respect to the first direction, is greater than the first angle and the second angle.

13. The liquid crystal display of claim 12, wherein the third angle ranges from 15° to 30°.

14. The liquid crystal display of claim 13, wherein the first angle is greater than 0° and less than 10°, and the second angle is greater than 10° and less than 15°.

15. The liquid crystal display of claim 14, further comprising a gate line extending in the first direction.

16. A liquid crystal display, comprising:
a first substrate and a second substrate facing each other;
a liquid crystal layer interposed between the first substrate and the second substrate;
a first electrode disposed on the first substrate, the first electrode having a planar shape; and
a second electrode disposed on the first substrate and comprising a plurality of branch electrodes overlapping the first electrode,
wherein a branch electrode of the plurality of branch electrodes comprises:
a pair of boundary regions disposed at opposing ends of each branch electrode; and
a main region disposed between the pair of boundary regions,
angles, formed by the plurality of branch electrodes with a first direction in the main region, gradually increase from a reference line parallel to the first direction,
a largest angle, among the angles in the main region, is a first angle, and a second angle, formed by the branch electrode in the pair of boundary regions with the first direction, is larger than the first angle.

17. The liquid crystal display of claim 16, wherein in the main region an angle, formed by a branch electrode disposed on the reference line among the plurality of branch electrodes with the first direction, is 0°.

18. The liquid crystal display of claim 17, wherein a length of each of the pair of boundary regions in the first direction is less than or equal to 10 μm.

19. The liquid crystal display of claim 18, wherein the second angle ranges from 15° to 30°.

20. The liquid crystal display of claim 19, wherein the first angle is greater than 0° and less than 15°.

21. The liquid crystal display of claim 20, wherein angles at which the plurality of branch electrodes form with the first direction in the main region gradually increase away from the reference line.

22. The liquid crystal display of claim 21, wherein widths of the plurality of branch electrodes in the main region are constant.

23. The liquid crystal display of claim 22, further comprising a gate line extending in the first direction.

24. The liquid crystal display of claim 22, further comprising a data line extending in the first direction.

25. The liquid crystal display of claim 16, wherein a length of each of the pair of boundary regions in the first direction is less than or equal to 10 μm.

26. The liquid crystal display of claim 16, wherein the second angle ranges from 15° to 30°.

27. The liquid crystal display of claim 16, wherein the first angle is greater than 0° and less than 15°.

28. The liquid crystal display of claim 16, further comprising a gate line extending in the first direction.

29. The liquid crystal display of claim 16, further comprising a data line extending in the first direction.

30. An exposure mask to form a second electrode in manufacturing a liquid crystal display comprising a first electrode disposed on a first substrate between the first substrate and a second substrate facing the first substrate with a liquid crystal layer interposed between the first and second substrates, wherein the first electrode having a planar shape and the second electrode comprises a plurality of branch electrodes overlapping the first electrode, the exposure mask comprising:
 a first part corresponding to a space between two adjacent branch electrodes among the plurality of branch electrodes of the second field generating electrode; and
 a second part connected to a vertex of a corner of an acute angle among corners of the first part and comprising four straight sides.

31. The exposure mask of claim 30, wherein the four straight sides are connected to each other, and an angle formed by any two adjacent straight sides is a right angle.

32. The exposure mask of claim 31, wherein a length of a straight side that is not connected with the first part, among the four straight sides, is greater than or equal to 2 μm and less than the spatial resolution of a light exposure used in conjunction with the exposure mask, and
 a length of a straight side connected with the first part, among the four straight sides, is greater than or equal to 1.5 μm and less than 3.0 μm.

* * * * *